(12) United States Patent
Ono et al.

(10) Patent No.: US 12,353,044 B2
(45) Date of Patent: Jul. 8, 2025

(54) LENS APPARATUS AND IMAGE PICKUP APPARATUS

(71) Applicant: CANON KABUSHIKI KAISHA, Tokyo (JP)

(72) Inventors: Shuhei Ono, Tokyo (JP); Kosuke Nozaki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 438 days.

(21) Appl. No.: 18/064,403

(22) Filed: Dec. 12, 2022

(65) Prior Publication Data

US 2023/0194827 A1      Jun. 22, 2023

(30) Foreign Application Priority Data

Dec. 17, 2021   (JP) .................................. 2021-205127

(51) Int. Cl.
  *G02B 7/02*   (2021.01)
  *H04N 23/54*  (2023.01)
  (Continued)

(52) U.S. Cl.
  CPC ............. *G02B 7/022* (2013.01); *G02B 7/021* (2013.01); *G02B 7/023* (2013.01); *G02B 7/026* (2013.01);
  (Continued)

(58) Field of Classification Search
  CPC ........ G02B 7/021; G02B 7/022; G02B 7/023; G02B 7/026
  (Continued)

(56) References Cited

U.S. PATENT DOCUMENTS 4,050,037 A * 9/1977 Knowles ................... H01S 3/03
                                                      359/830
9,176,298 B1   11/2015 Gustafson
(Continued)

FOREIGN PATENT DOCUMENTS

CN         105578736 A      5/2016
JP           6054720 B2    12/2016
(Continued)

OTHER PUBLICATIONS

U.S. Appl. No. 18/064,408, filed Dec. 12, 2022 "Image Pickup Apparatus".
(Continued)

*Primary Examiner* — Ricky L Mack
*Assistant Examiner* — Natasha Nigam
(74) *Attorney, Agent, or Firm* — Cowan, Liebowitz & Latman, P.C.

(57) ABSTRACT

A lens apparatus includes a lens unit and a fixed member engaged with the lens unit. A position of the lens unit relative to the fixed member is adjustable in an optical axis direction by rotating the lens unit relative to the fixed member about an optical axis. The lens unit includes a holding member configured to hold the lens and engaged with the fixed member, and a press member engaged with the holding member and configured to press the lens against the holding member in the optical axis direction. The holding member includes an engagement portion engageable with a tool configured to rotate the lens unit about the optical axis relative to the fixed member. The press member includes a hole portion penetrating in the optical axis direction. The hole portion enables the tool to be engaged with the engagement portion through the hole portion.

7 Claims, 8 Drawing Sheets

(51) Int. Cl.
*H04N 23/55* (2023.01)
*H04N 23/57* (2023.01)

(52) U.S. Cl.
CPC .............. *H04N 23/54* (2023.01); *H04N 23/55* (2023.01); *H04N 23/57* (2023.01)

(58) Field of Classification Search
USPC .................................................. 359/829, 830
See application file for complete search history.

(56) References Cited

U.S. PATENT DOCUMENTS

| | | | |
|---|---|---|---|
| 9,658,423 B2 | 5/2017 | Gustafson | |
| 10,054,757 B2 | 8/2018 | Knutsson | |
| 11,867,967 B2 | 1/2024 | Kim | |
| 11,966,040 B2 | 4/2024 | Ofir | |
| 2009/0237537 A1 | 9/2009 | Maruyama | |
| 2013/0093948 A1 | 4/2013 | Takeshita | |
| 2014/0104479 A1 | 4/2014 | Samuels | |
| 2014/0307162 A1 | 10/2014 | Li | |
| 2016/0295081 A1 | 10/2016 | Graff | |
| 2017/0042058 A1 | 2/2017 | Pope | |
| 2017/0129418 A1 | 5/2017 | Koshiba | |
| 2017/0276895 A1 | 9/2017 | Sakuma et al. | |
| 2018/0107099 A1 | 4/2018 | Yasuda | |
| 2018/0180835 A1* | 6/2018 | Shima | G02B 7/022 |
| 2018/0234594 A1 | 8/2018 | Lim | |
| 2018/0241917 A1 | 8/2018 | Zhang | |
| 2019/0349507 A1 | 11/2019 | Lee | |
| 2019/0373142 A1 | 12/2019 | Fujiwara | |
| 2020/0033549 A1 | 1/2020 | Liu | |
| 2020/0049932 A1* | 2/2020 | Wei | G02B 7/022 |
| 2021/0302805 A1 | 9/2021 | Yoshida | |
| 2021/0397072 A1 | 12/2021 | Ding | |
| 2022/0059266 A1 | 2/2022 | Saito | |
| 2022/0196963 A1 | 6/2022 | Suginome | |
| 2022/0357551 A1 | 11/2022 | Liu | |
| 2023/0098815 A1 | 3/2023 | Cho | |
| 2023/0152576 A1 | 5/2023 | Nozaki | |
| 2023/0194827 A1 | 6/2023 | Shuhei | |
| 2023/0199288 A1 | 6/2023 | Saito | |
| 2023/0199289 A1 | 6/2023 | Suzuki | |
| 2023/0213839 A1 | 7/2023 | Watanabe | |
| 2023/0244128 A1 | 8/2023 | Van Den Brink | |
| 2023/0367184 A1 | 11/2023 | Inaba | |
| 2023/0418020 A1 | 12/2023 | Hwang | |

FOREIGN PATENT DOCUMENTS

| | | |
|---|---|---|
| JP | 2017-098891 A | 6/2017 |
| JP | 2018-141861 A | 9/2018 |
| JP | 6391122 B2 | 9/2018 |
| JP | 2020-014003 A | 1/2020 |
| JP | 2020-027278 A | 2/2020 |
| JP | 6912530 B2 | 8/2021 |

OTHER PUBLICATIONS

U.S. Appl. No. 18/064,420, filed Dec. 12, 2022 "Image Pickup Apparatus".
U.S. Appl. No. 18/064,425, filed Dec. 12, 2022 "Image Pickup Apparatus".
Jun. 24, 2024 U.S. Office Action, that issued in U.S. Appl. No. 18/064,420.
U.S. non-Final Office Action issued on Jun. 6, 2024, that issued in the corresponding U.S. Appl. No. 18/064,408.
U.S. Notice of Allowance issued on Jun. 11, 2024, that issued in the corresponding U.S. Appl. No. 18/064,425.

* cited by examiner

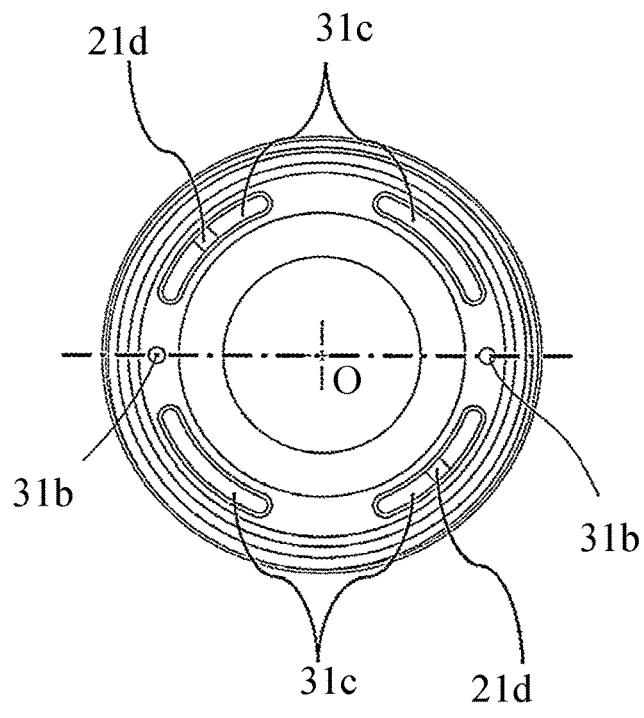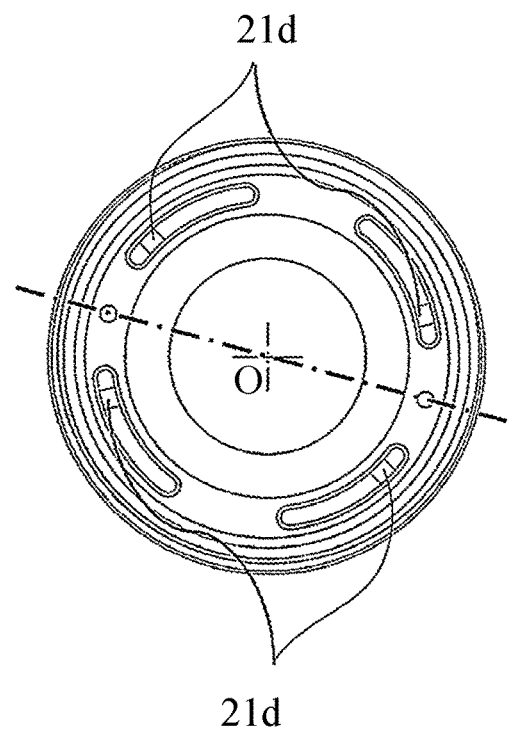
FIG. 10A  FIG. 10B
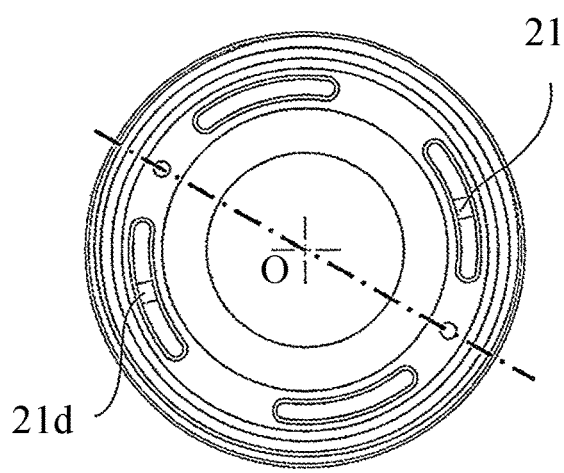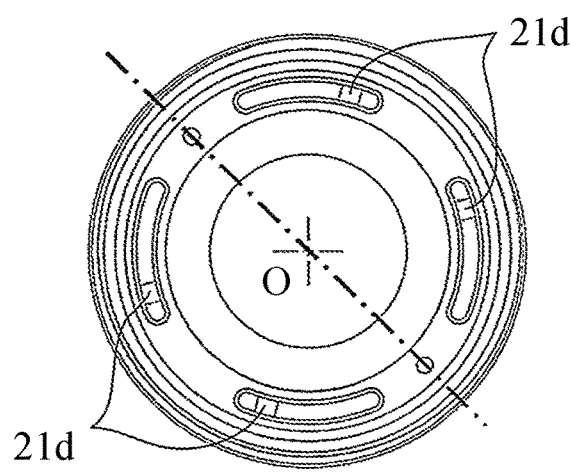
FIG. 10C  FIG. 10D

LENS APPARATUS AND IMAGE PICKUP APPARATUS

BACKGROUND

Technical Field

One of the aspects of the disclosure relates to a lens holding structure in a lens apparatus.

Description of the Related Art

In order to fix a lens closest to an object or image plane relative to a holding member such as a barrel in the lens apparatus, a press member such as a press ring for pressing the lens held by the holding member is often used.

Japanese Patent Laid-Open No. ("JP") 2020-027278 discloses a lens apparatus that uses a press ring having a female threaded portion screwed with a male threaded portion of a barrel in order to fix a lens closest to an object to the barrel. In this lens apparatus, concave portions or openings provided at a plurality of locations in a circumferential direction of the press ring are filled with an adhesive to fix the lens to the press ring and the press ring to the barrel. JP 2018-141861 discloses a lens apparatus that uses a press ring having a male threaded portion screwed with a female threaded portion of a barrel in order to fix a lens closest to an image plane. In this lens apparatus, concave portions are provided at a plurality of locations in a circumferential direction of the female threaded portion of the press ring and are filled with an adhesive to fix the lens.

As disclosed in JPs 2020-027278 and 2018-141861, in a case where the male threaded portion is provided on the outer circumference of the barrel of the lens apparatus, and the barrel is rotated around the optical axis relative to the fixed member, such as the fixed barrel having the female threaded portion screwed with the male threaded portion, the position of the barrel relative to the fixed barrel can be adjusted in the optical axis direction. The position is adjusted, for example, during focusing.

However, in the lens apparatus disclosed in JP 2020-027278, in an attempt to apply a rotational force to the press ring and to rotate the barrel relative to the fixed barrel, the adhesion between the press ring and the lens or barrel may be peeled off. It is conceivable to provide an opening in a circumferential wall of the fixed barrel that enables the barrel to be accessed from the outside in the radial direction so as to apply a rotational force to the barrel, but it is then necessary to lid the opening so as to prevent external light or dust from intruding after the position is adjusted, and the number of components and the number of assembly processes increase.

On the other hand, as disclosed in the lens apparatus disclosed in JP 2018-141861, in a case where the press ring is disposed on the image side of the lens closest to the image plane, the space between the lens and the image plane becomes longer in the optical axis direction and it becomes difficult to form a compact lens apparatus with a short flange back.

SUMMARY

One of the aspects of the disclosure provides a compact lens apparatus and an image pickup apparatus using the same, each of which can stably fix a lens to a holding member using a press member.

A lens apparatus according to one aspect of the disclosure includes a lens unit and a fixed member engaged with the lens unit. A position of the lens unit relative to the fixed member is adjustable in an optical axis direction by rotating the lens unit relative to the fixed member about an optical axis. The lens unit includes a holding member configured to hold the lens and engaged with the fixed member, and a press member engaged with the holding member and configured to press the lens against the holding member in the optical axis direction. The holding member includes an engagement portion engageable with a tool configured to rotate the lens unit about the optical axis relative to the fixed member, and the press member includes a hole portion penetrating in the optical axis direction and enabling the tool to be engaged with the engagement portion through the hole portion. Alternatively, the holding member includes a pair of engagement portions located on both sides of the optical axis, and the press member includes a pair of hole portions penetrating in the optical axis direction and located on both sides of the optical axis so as to overlap the pair of engagement portions in the optical axis direction. An image pickup apparatus including the above lens apparatus also constitutes another aspect of the disclosure.

Further features of the disclosure will become apparent from the following description of exemplary embodiments with reference to the attached drawings.

BRIEF DESCRIPTION OF THE DRAWINGS

FIGS. 10A to 10D illustrate positional relationships between arc hole portions and tool engagement portions in the second embodiment.

DESCRIPTION OF THE EMBODIMENTS

Referring now to the accompanying drawings, a description will be given of embodiments according to the disclosure.

First Embodiment

Figure 1:
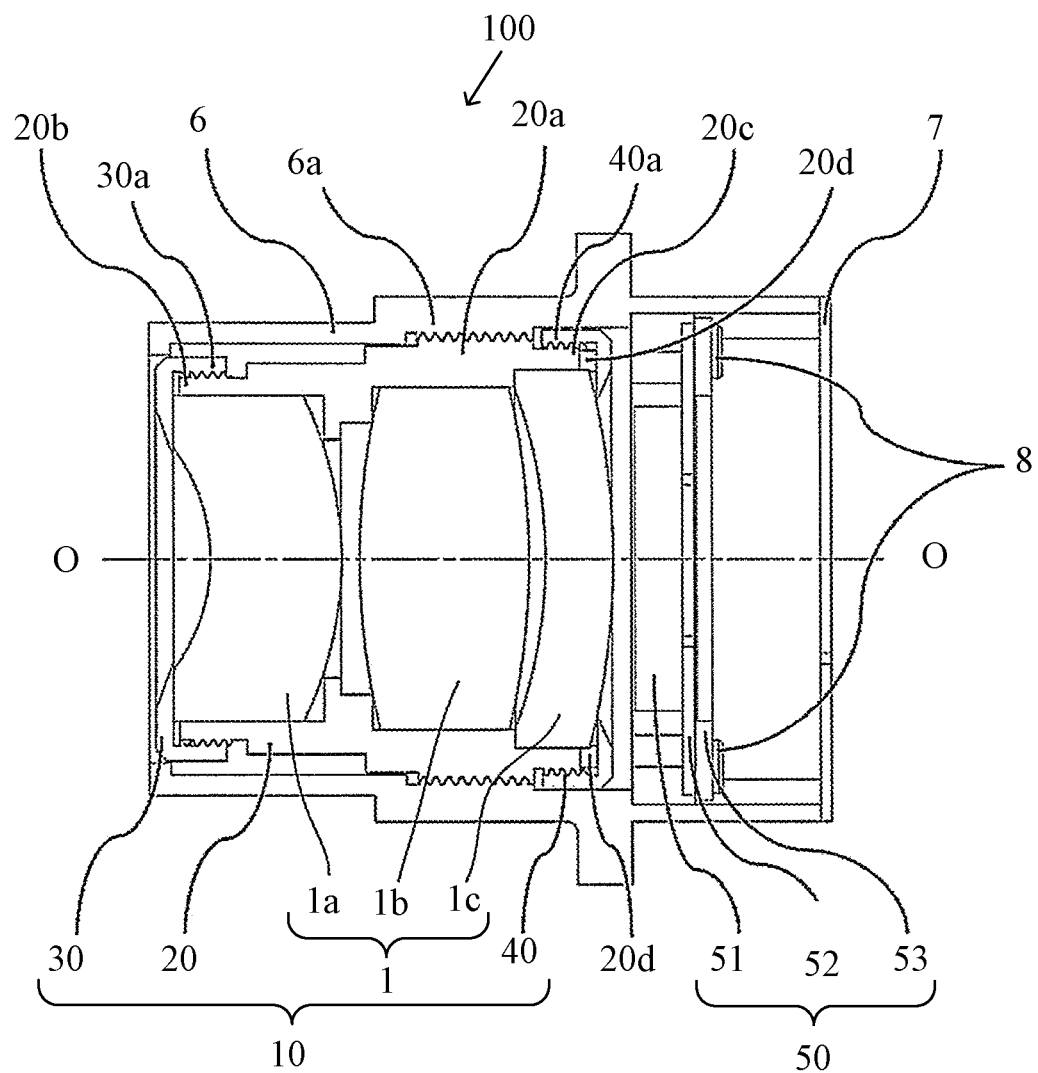
FIG. 1 is a sectional view of a camera module according to a first embodiment.

FIG. 1 illustrates a section of a camera module 100 as an image pickup apparatus according to a first embodiment of the disclosure. In this figure, O denotes an optical axis of the lens unit 10, which will be described below, and a direction in which the optical axis O extends will be referred to as an optical axis direction.

A camera module 100 includes a lens unit 10, a fixed barrel 6 as a fixed member, a sensor unit 50, and a cover 7.

The sensor unit 50 includes a sensor substrate 52 on which an image sensor 51 such as a CCD sensor or a CMOS sensor is mounted, and a sensor plate 53 to which the sensor substrate 52 is fixed, and the sensor unit 50 is fixed to the fixed barrel 6 with screws 8. The sensor unit 50 is thereby held by the fixed barrel 6.

The lens unit 10 includes a lens frame 20 as a holding member, and a lens unit 1 as an optical system incorporated into the lens frame. The lens unit 1 includes, in order from an object side (front side) to the image side (rear side), a lens 1a, a lens 1b, and a lens 1c. The lens unit 10 also includes a front press ring 30 that presses the lens 1a closest to the front in the lens unit 1 from the front side, and a rear press ring 40 that presses the lens 1c closest to the rear from the rear side. The front press ring 30 holds the lens 1a, and the rear press ring 40 holds the lens 1c.

A front male threaded portion (first fixing threaded portion) 20b is provided to a front portion of an outer circumference portion of the lens frame 20. A female threaded portion (second fixing threaded portion) 30a is provided to an inner circumference portion of the front press ring 30. The lens 1a can be pressed against the lens frame 20 from the front side to the rear side and fixed to the lens frame 20 by rotating the front press ring 30 about the optical axis relative to the lens frame 20 in which the lens 1a is incorporated and by screwing the female threaded portion 30a with the front male threaded portion 20b.

A rear male threaded portion (first fixing threaded portion) 20c is provided to a rear portion of the outer circumference portion of the lens frame 20. A female threaded portion (second fixing threaded portion) 40a is provided to an inner circumference portion of the rear press ring 40. The lens 1c can be pressed against the lens frame 20 from the rear side to the front side and fixed to the lens frame 20 by rotating the rear press ring 40 about the optical axis relative to the lens frame 20 in which the lens 1c is incorporated and by screwing the female threaded portion 40a with the rear male threaded portion 20c.

A focusing male threaded portion (first adjusting threaded portion) 20a is provided to an intermediate portion of the outer circumference portion of the lens frame 20, and a focusing female threaded portion (second adjusting threaded portion) 6a is provided to the inner circumference portion of the fixed barrel 6. The lens unit 10 is held by the fixed barrel 6 by rotating the lens frame 20 inserted into the fixed barrel 6 about the optical axis and by screwing the focusing male threaded portion 20a with the focusing female threaded portion 6a. In a case where the lens unit 10 held by the fixed barrel 6 is rotated about the optical axis relative to the fixed barrel 6, the lens unit 10 can be moved relative to the fixed barrel 6 in the optical axis direction. Thereby, the position of the lens unit 10 can be adjusted relative to the fixed barrel 6, that is, focusing of the lens unit 10 can be performed.

After focusing is performed in this way, the sensor unit 50 is incorporated and fixed on the rear side of the lens unit 10 in the fixed barrel 6, and a rear end opening in the fixed barrel 6 is closed with the cover 7.

In the camera module 100, an object image (optical image) formed by the lens unit 10 is photoelectrically converted (captured) by the image sensor 51.

Figure 2:
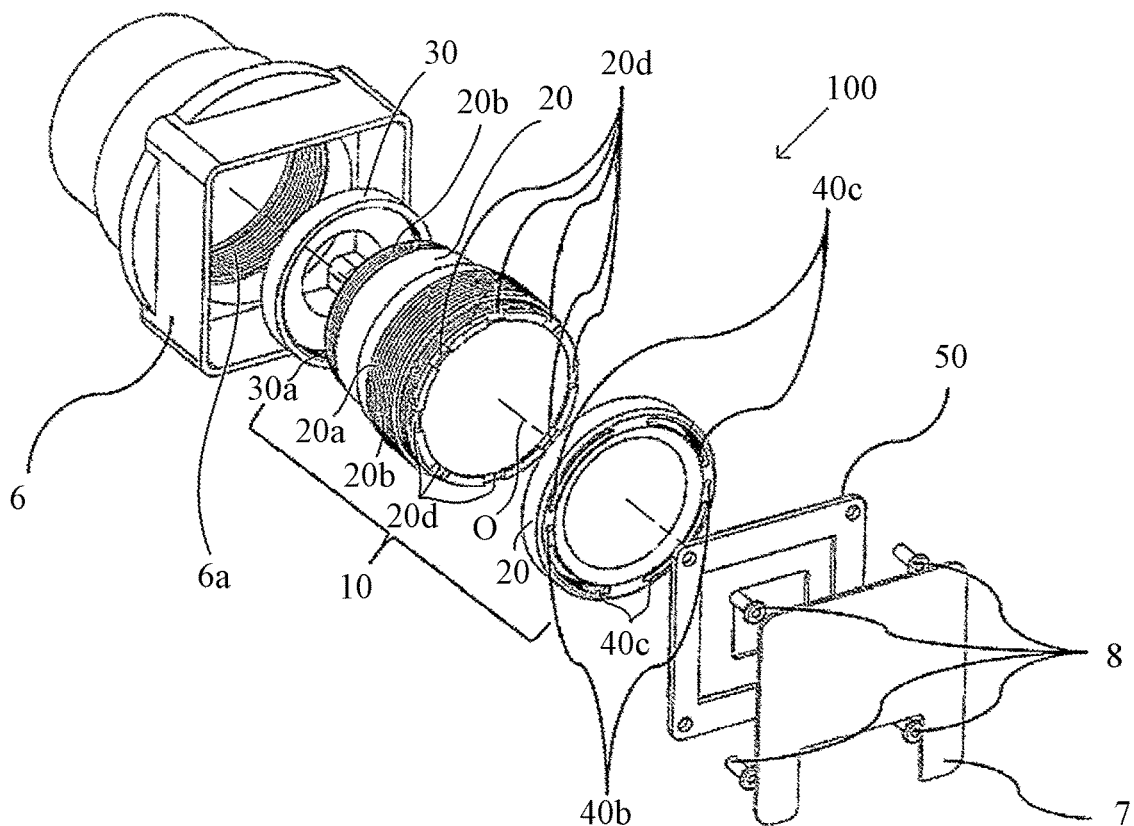
FIG. 2 is an exploded perspective view of the camera module according to the first embodiment.

FIG. 2 is an exploded view of the camera module 100 viewed obliquely from the back. A pair of engagement hole portions 40b opening toward the rear side are formed at two locations on the rear end surface (end surface on the image side) of the rear press ring 40 on both sides of the optical axis O (point-symmetrically with respect to the optical axis O). An unillustrated tool is engaged with the pair of engagement hole portions 40b to rotate the rear press ring 40 about the optical axis relative to the lens frame 20. Thereby, the female threaded portion 40a of the rear press ring 40 can be screwed into the rear male threaded portion 20c of the frame 20.

Tool engagement portions 20d as concave portions are provided at a plurality of locations (eight locations herein) on the rear end portion of the lens frame 20 at regular intervals in the circumferential direction. These eight tool engagement portions 20d include four pairs of tool engagement portions 20d located on both sides of the optical axis O (point-symmetrically with respect to the optical axis O).

A plurality of (four herein) long hole (or elongated or slotted) portions 40c having in an arc shape around the optical axis penetrating through the rear press ring 40 in the optical axis direction are opened in the rear end surface of the rear press ring 40. In this embodiment, the four long hole portions 40c are disposed at regular intervals in the circumferential direction. These four long hole portions 40c include two pairs of long hole portions 40c located on both sides of the optical axis O (point-symmetrically with respect to the optical axis O).

Figure 5A:
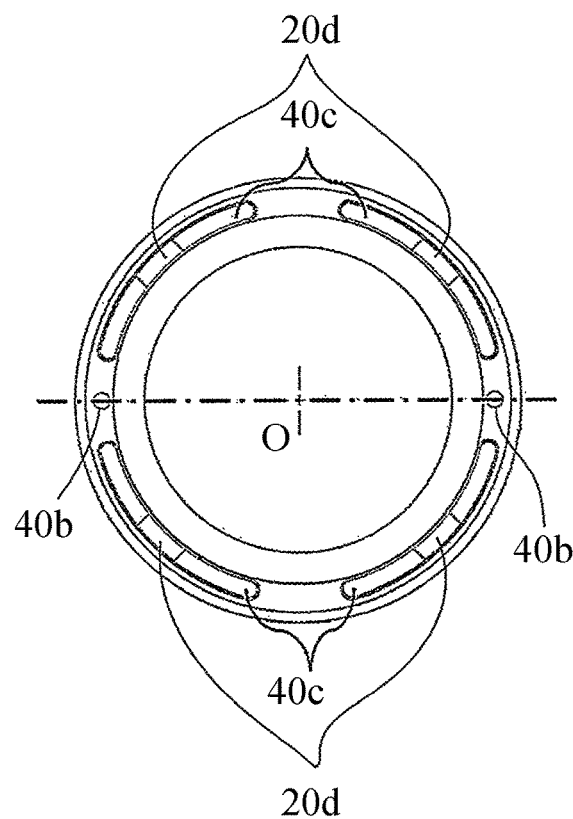
FIGS. 5A to 5D illustrate positional relationships between arc hole portions and tool engagement portions in the first embodiment.

As illustrated in FIG. 5A, while the rear press ring 40 is incorporated in the lens frame 20, the two pairs of long hole portions 40c and the two pairs of tool engagement portions 20d overlap each other in the optical axis direction. Therefore, the pair of tool engagement portions 20d that overlap the long hole portions 40c in the optical axis direction can be accessed through any pair of long hole portions 40c.

Figure 3:
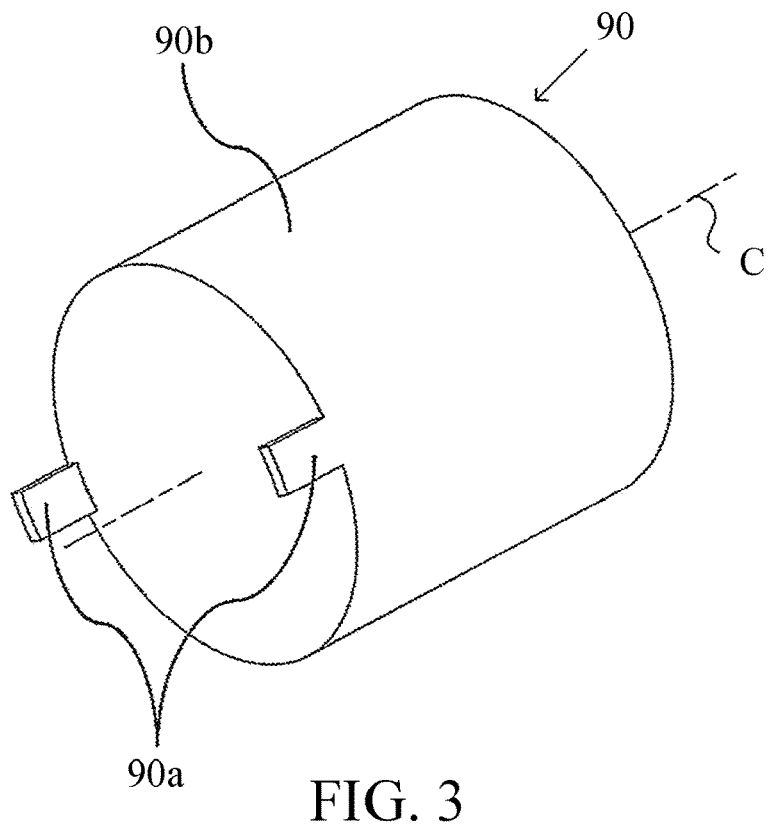
FIG. 3 is a perspective view illustrating a focusing tool for the camera module according to the first embodiment.

FIG. 3 illustrates a focusing tool 90 that is used for focusing of the camera module 100 according to this embodiment. The focusing tool 90 includes a cylindrical grip portion 90b and a pair of engagement portions 90a as projections at two locations on both sides of a central axis C (point-symmetrically with respect to the central axis C) of the grip portion 90b at the front end of the grip portion 90b. The pair of engagement portions 90a are engageable with any of the four pairs of tool engagement portions 20d of the lens frame 20.

Figure 4A:
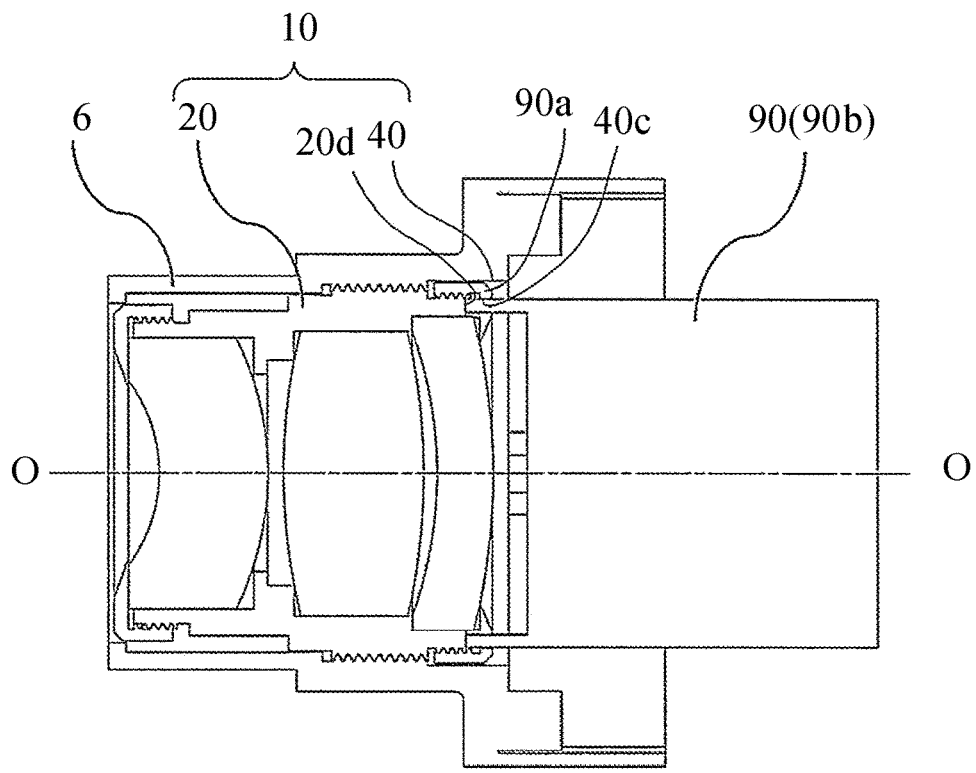
FIGS. 4A and 4B are sectional views illustrating a focusing process according to the first embodiment.
Figure 4B:
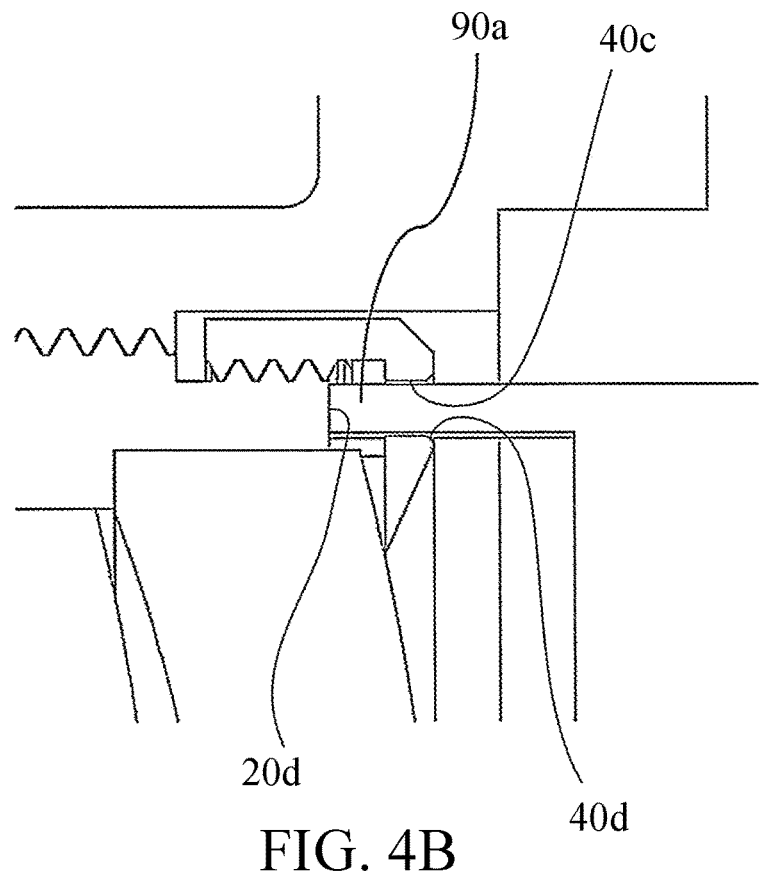

FIG. 4A illustrates a focusing process using the focusing tool 90 illustrated in FIG. 3. FIG. 4B partially enlarges FIG. 4A. The focusing tool 90 is inserted into the fixed barrel 6 through the rear end opening of the fixed barrel 6 in which the lens unit 10 is incorporated and the sensor unit 50 is not incorporated. Then, the engagement portions 90a of the focusing tool 90 are engaged with the pair of tool engagement portions 20d through the two long hole portions 40c located on both sides of the optical axis O (point-symmetrically with respect to the optical axis O) among the four long hole portions 40c in the rear press ring 40. A tapered tool guide portion 40d is provided near the entrance of each long hole portion 40c to guide a movement of the engagement portion 90a of the focusing tool 90 toward the tool engagement portion 20d.

While the engagement portions 90a are engaged with the tool engagement portions 20d, an operator holding the grip portion 90b of the focusing tool 90 rotates the focusing tool 90 about the optical axis. Thereby, focusing can be performed by rotating the lens unit 10 relative to the fixed barrel 6 without directly applying a rotational force to the rear press ring 40. At this time, each long hole portion 40c into which the engagement portion 90a is inserted has a length in a circumferential direction that does not prevent the engagement portion 90a with the lens unit 10 from rotating by a predetermined angle.

If a rotational force is directly applied to the rear press ring 40 during focusing, the female threaded portion 40a of the rear press ring 40 may be over-tightened or loose relative to the rear male threaded portion 20c of the lens frame 20. As a result of this overtightening or loosening, optical performance may deteriorate. On the other hand, this embodiment can apply a rotational force to the lens unit 10 without directly applying a rotational force to the rear press ring 40.

FIGS. 5A to 5D illustrate positional relationships between the long hole portions 40c and the tool engagement portions 20d viewed from the image side. Each of the lens frame 20, the lens unit 1, and the rear press ring 40 has variations in component accuracy. Therefore, a proper screwed amount (engagement amount) of the rear press ring 40 into the lens frame 20, that is, a rotational position of the rear press ring 40 relative to the lens frame 20 is different for each individual lens unit 10. This embodiment arranges the long hole portions 40c and the tool engagement portions 20d in the following positional relationship so as to cope with individual differences in the rotational position of the rear press ring 40 relative to the lens frame 20 for each lens unit 10.

Figure 5B:
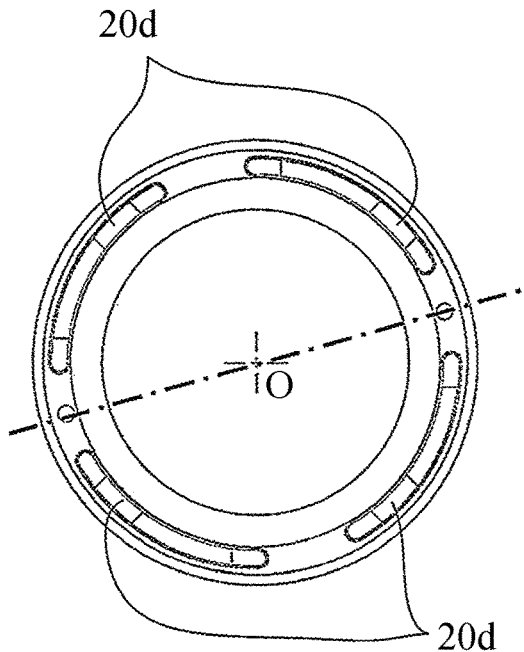
Figure 5C:
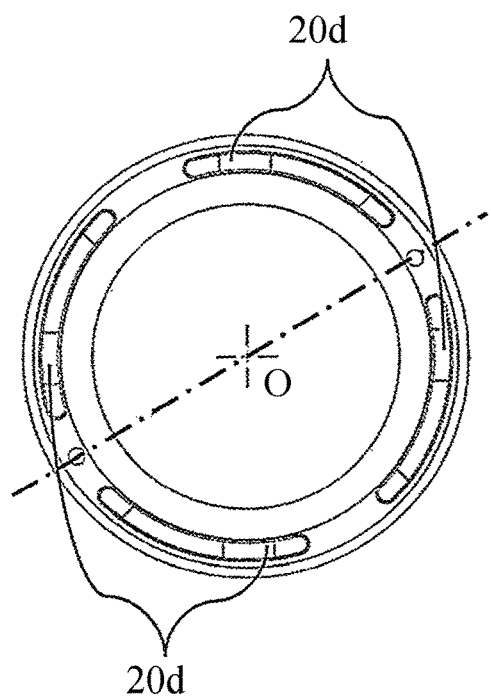
Figure 5D:
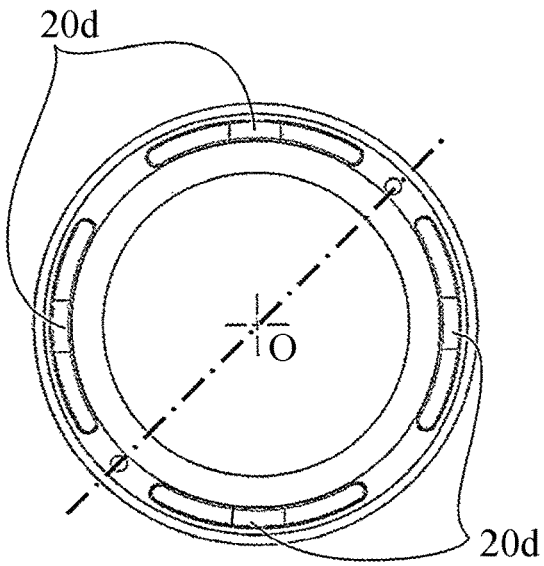

FIG. 5A illustrates a state in which the rear press ring 40 is in such a rotational position relative to the lens frame 20 that a line connecting the pair of engagement hole portions 40b of the rear press ring 40 (alternate long and short dash line in the figure) is horizontal. FIG. 5B illustrates a state in which the rear press ring 40 has been rotated relative to the lens frame 20 counterclockwise when viewed from the image side by 15° from the state illustrated in FIG. 5A. FIG. 5C illustrates a state in which the rear press ring 40 has been rotated relative to the lens frame 20 counterclockwise by 15° from the state illustrated in FIG. 5B. FIG. 5D illustrates a state in which the rear press ring 40 has been rotated relative to the lens frame 20 counterclockwise by 15° from the state illustrated in FIG. 5C.

As understood from these figures, regardless of the rotational position of the rear press ring 40 relative to the lens frame 20, the two pairs of long hole portions 40c and the two pairs of tool engagement portions 20d overlap each other in the optical axis direction. Therefore, the engagement portions 90a of the focusing tool 90 can be engaged with the pair of tool engagement portions 20d overlapping any one of the pairs of long hole portions 40c in the optical axis direction via the pair of long hole portions 40c and the lens unit 10 can be rotated about the optical axis.

The relative positional relationship between the long hole portions 40c and the tool engagement portions 20d are the same between the states illustrated in FIGS. 5A and 5C, and the same between the states illustrated in FIGS. 5B and 5D. Therefore, even if the proper screwed amount of the rear press ring 40 with the lens frame 20 varies due to variations in component accuracy, the relative positional relationship between the long hole portions 40c and the tool engagement portions 20d will be close to one of the above two states. Hence, the engagement portions 90a of the focusing tool 90 can be engaged with the tool engagement portions 20d regardless of the component accuracy.

This embodiment can provide focusing by rotating the lens unit 10 relative to the fixed barrel 6 about the optical axis and by moving it in the optical axis direction without affecting the tightening state of the rear press ring 40 relative to the lens frame 20.

Second Embodiment

Figure 6:
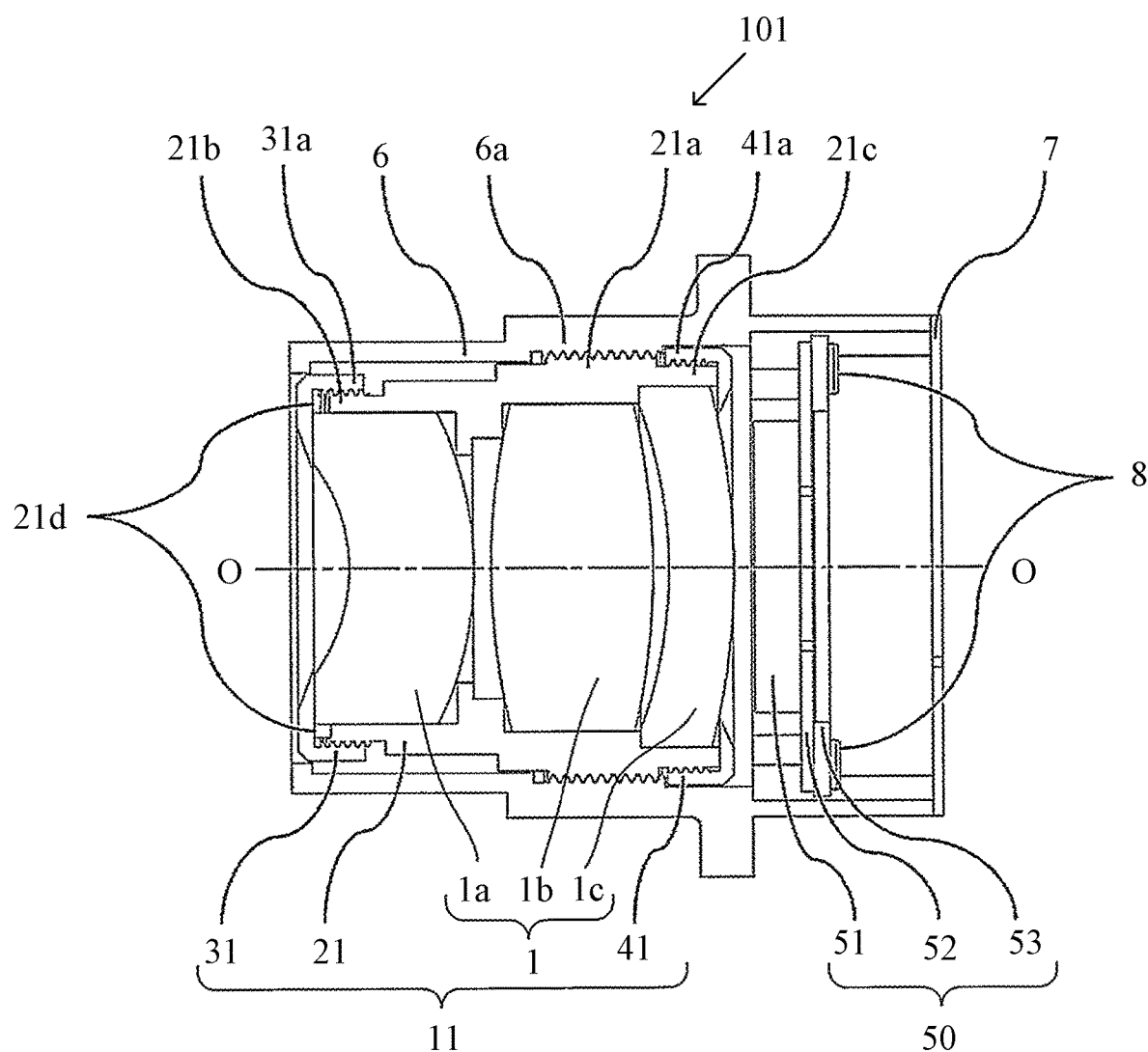
FIG. 6 is a sectional view of a camera module according to a second embodiment.

FIG. 6 illustrates a section of a camera module 101 according to a second embodiment of the disclosure. The basic configuration of the camera module 101 is the same as that of the camera module 100 according to the first embodiment, but the lens unit 11 includes a lens frame 21 in which the lens unit 1 is incorporated, a front press ring 31, and a rear press ring 41.

A front male threaded portion (first fixing threaded portion) 21b is provided to a front portion of an outer circumference portion of the lens frame 21. A female threaded portion (second fixing threaded portion) 31a is provided to an inner circumference portion of the front press ring 31. The lens 1a can be pressed against the lens frame 21 from the front side to the rear side and fixed to the lens frame 21 by rotating the front press ring 31 about the optical axis relative to the lens frame 21 in which the lens 1a closest to the front of the lens unit 1 is incorporated, and by screwing the female threaded portion 31a with the front male threaded portion 21b for tightening up.

A rear male threaded portion (first fixing threaded portion) 21c is provided to a rear portion of the outer circumference portion of the lens frame 21. A female threaded portion (second fixing threaded portion) 41a is provided to an inner circumference portion of the rear press ring 41. The lens 1c can be pressed against the lens frame 21 from the rear side to the front side and fixed to the lens frame 21 by rotating the rear press ring 41 about the optical axis relative to the lens frame 21 in which the lens 1c closest to the rear is incorporated and by screwing the female threaded portion 41a with the rear male threaded portion 21c for tightening up.

A focusing male threaded portion 21a is provided to an intermediate portion of the outer circumference portion of the lens frame 21. The lens unit 11 is held by the fixed barrel 6 by rotating the lens frame 21 that has been inserted into the fixed barrel 6 about the optical axis and by screwing the focusing male threaded portion 21a with the focusing female threaded portion 6a provided to the inner circumference portion of the fixed barrel 6. Even this embodiment can move the lens unit 11 relative to the fixed barrel 6 in the optical axis direction by rotating the lens unit 11 held by the fixed barrel 6 about the optical axis relative to the fixed barrel 6. Thereby, focusing of the lens unit 11 can be performed.

After focusing is performed in this way, the sensor unit 50 is incorporated and fixed on the rear side of the lens unit 11 in the fixed barrel 6, and the rear end opening in the fixed barrel 6 is closed with the cover 7.

Figure 7:
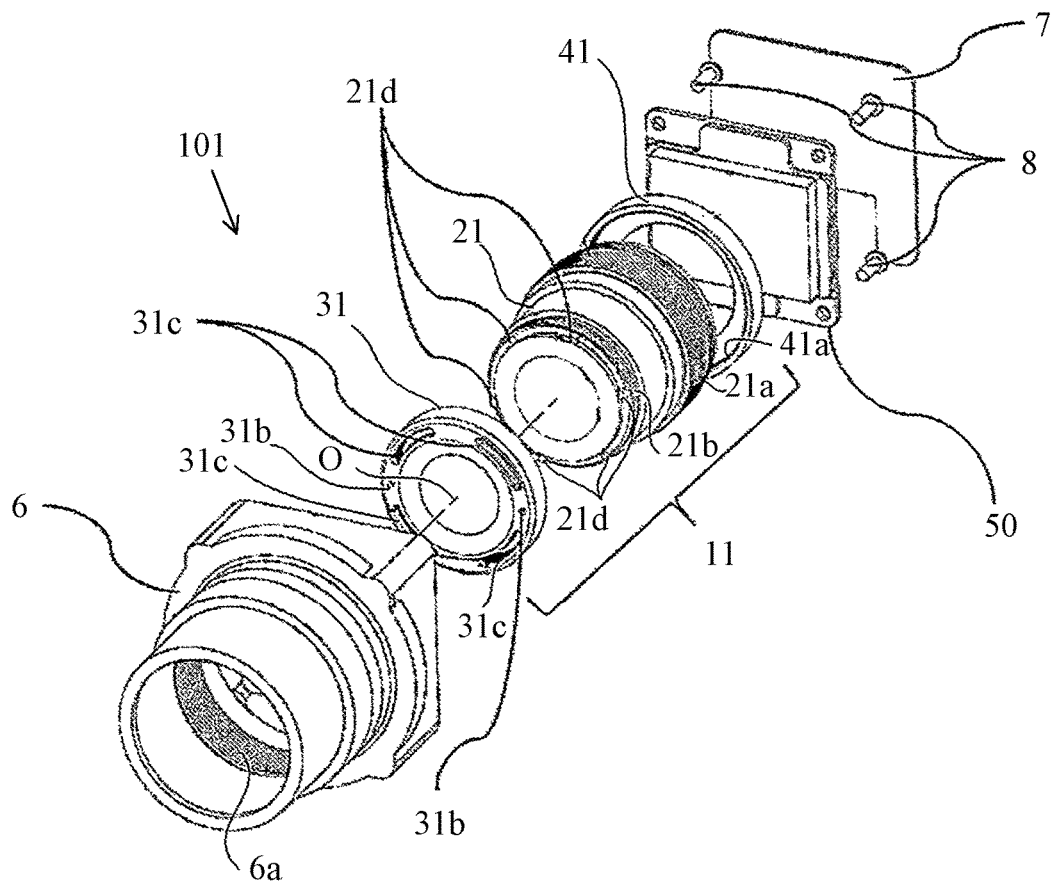
FIG. 7 is an exploded perspective view of the camera module according to the second embodiment.

FIG. 7 is an exploded view of the camera module 101 viewed obliquely from the front. A pair of engagement hole portions 31b opening toward the front are formed at two locations on the front end surface (end surface on the object side) of the front press ring 31 on both sides of the optical axis O (point-symmetrically with respect to the optical axis O). An unillustrated tool is engaged with the pair of engagement hole portions 31b to rotate the front press ring 31 about the optical axis relative to the lens frame 21. Thereby, the female threaded portion 31a of the front press ring 31 can be screwed into the front male threaded portion 21b of the lens frame 21.

Tool engagement portions 21d as convex portions are provided at six locations on the front end portion of the lens frame 21 at equal intervals in the circumferential direction. These six tool engagement portions 21d include three pairs of tool engagement portions 21d located on both sides of the optical axis O (point-symmetrically with respect to the optical axis O).

Four long hole portions 31c having an arc shape around the optical axis penetrating the front press ring 31 in the optical axis direction are opened in the front end surface of the front press ring 31. Even in this embodiment, the four long hole portions 31c are disposed at regular intervals in the circumferential direction. In addition, these four long hole portions 31c include two pairs of long hole portions 31c located on both sides of the optical axis O (point-symmetrically with respect to the optical axis O).

As illustrated in FIG. 10A, while the front press ring 31 is incorporated in the lens frame 21, at least one pair of long hole portions 31c out of the three pairs of long hole portions 31c and at least one pair of tool engagement portions 21d overlap each other in the optical axis direction. Therefore, the pair of tool engagement portions 21d that overlap the at least one pair of long hole portions 31c in the optical axis direction can be accessed through the long hole portions 31c.

Figure 8:
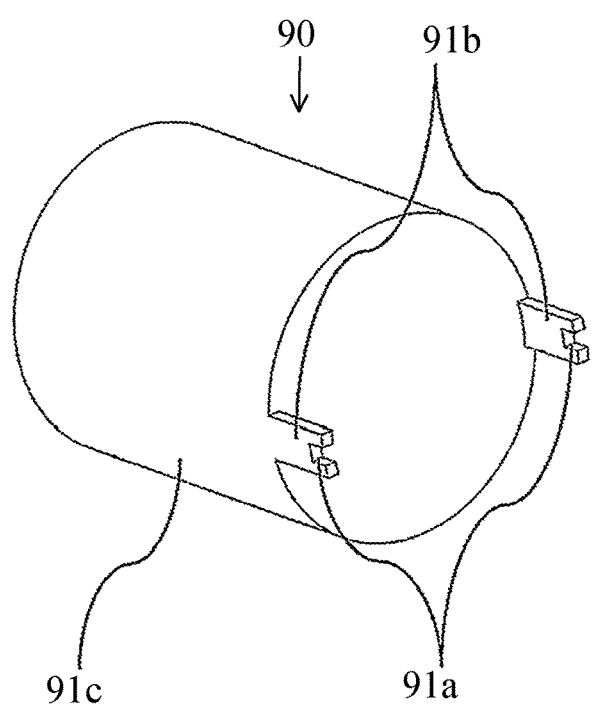
FIG. 8 is a perspective view of a focusing tool for the camera module according to the second embodiment.

FIG. 8 illustrates a focusing tool 91 that is used for focusing of the camera module 101 according to this embodiment. The focusing tool 91 includes a cylindrical grip portion 91c, a pair of arm portions 91b extending to the back from two locations on both sides of a central axis C (point-symmetrically with respect to the central axis C) of the grip portion 90c at the rear end of the grip portion 90c, and a pair of engagement portions 91a as concave portions provided at the tips of the arm portions 91b. The pair of engagement portions 91a are engageable with any of the three pairs of tool engagement portions 21d of the lens frame 21.

Figure 9A:
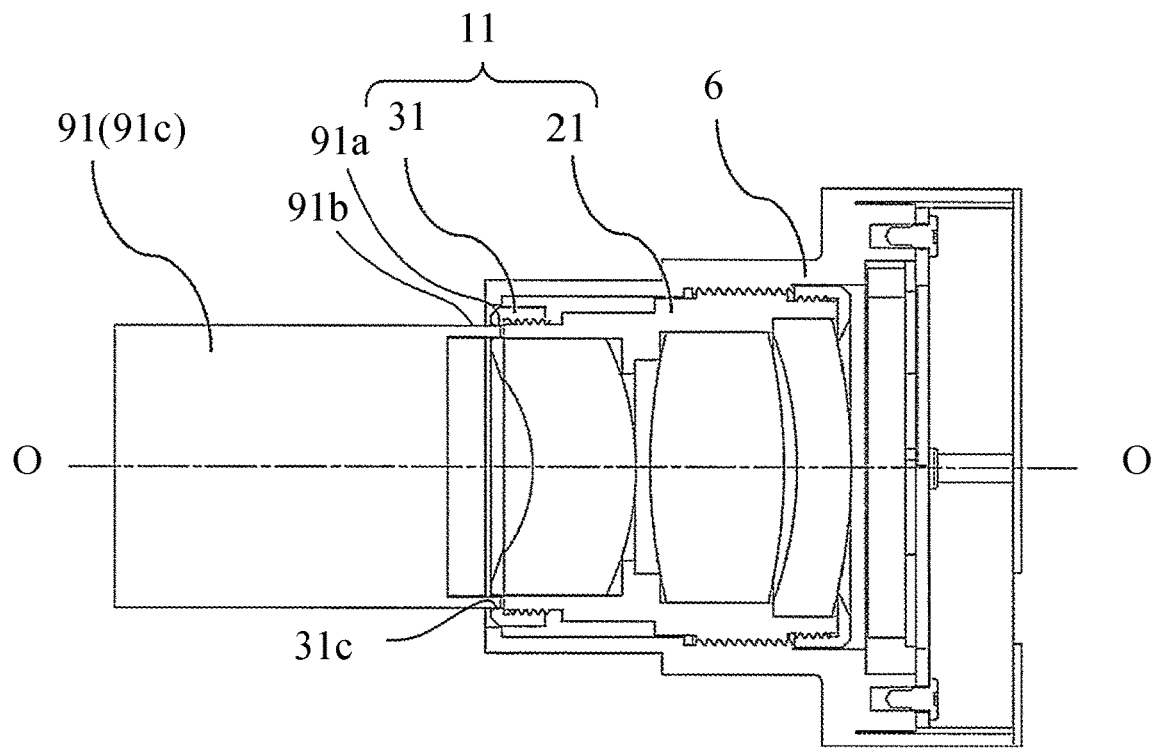
FIGS. 9A and 9B are sectional views illustrating a focusing process according to the second embodiment.
Figure 9B:
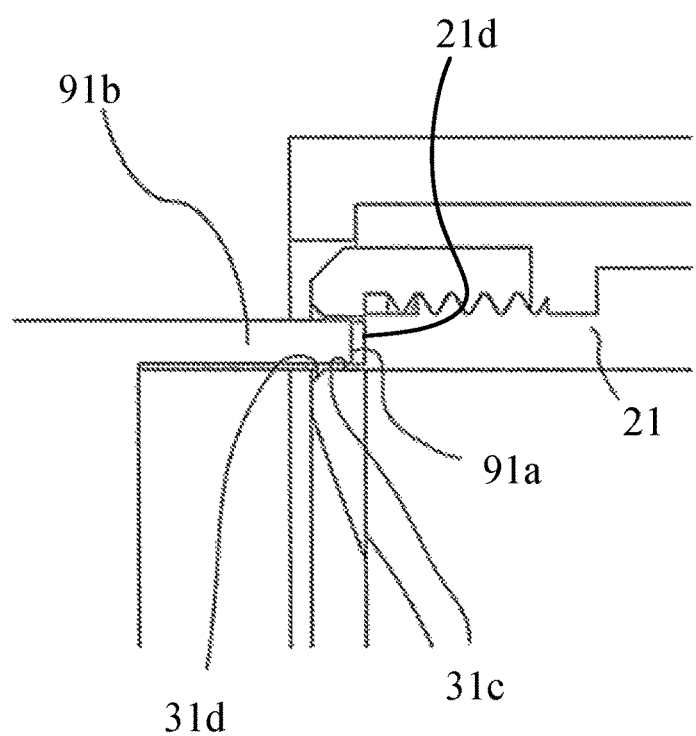

FIG. 9A illustrates a focusing process using the focusing tool 91 illustrated in FIG. 8. FIG. 9B partially enlarges FIG. 9A. In this embodiment, the focusing tool 91 is disposed on the front side of the lens unit 11. The engagement portions 91a of the focusing tool 91 are engaged with the pair of tool engagement portions 21d through the two long hole portions 31c located on both sides of the optical axis O (point-symmetrically with respect to the optical axis O) among the four long hole portions 31c in the front press ring 31 of the lens unit 11 incorporated in the fixed barrel 6. A tapered tool guide portion 31d is provided near the entrance of each long hole portion 31c to guide a movement of the engagement portion 91a of the focusing tool 91 toward the tool engagement portion 21d.

While the engagement portions 91a are engaged with the tool engagement portions 21d, an operator holding the grip portion 91c of the focusing tool 91 rotates the focusing tool 91 about the optical axis. Thereby, focusing can be performed by rotating the lens unit 11 relative to the fixed barrel 6 without directly applying a rotational force to the front press ring 31. At this time, each long hole portion 31c into which the engagement portion 91a (arm portion 91b) is inserted has a length in a circumferential direction that does not prevent the engagement portion 91a with the lens unit 11 from rotating by a predetermined angle. This embodiment can apply a rotational force to the lens unit 11 without directly applying a rotational force to the front press ring 31.

Even in this embodiment, as in the first embodiment, due to variations in component accuracy of the front press ring 31, the lens frame 21, and the lens unit 1, a proper screwed amount of the front press ring 31 relative to the lens frame 21 is different for each lens unit 11. Therefore, the long hole portions 31c and the tool engagement portions 21d are arranged so as to obtain the following positional relationship.

FIG. 10A illustrates a state in which the front press ring 31 is in such a rotational position relative to the lens frame 21 that a line connecting the pair of engagement hole portions 40b of the front press ring 31 (alternate long and short dash line in the figure) is horizontal. FIG. 10B illustrates a state in which the front press ring 31 has been rotated relative to the lens frame 21 counterclockwise when viewed from the image side by 15° from the state illustrated in FIG. 10A. FIG. 10C illustrates a state in which the front press ring 31 has been rotated relative to the lens frame 21 counterclockwise by 15° from the state illustrated in FIG. 10B. FIG. 10D illustrates a state in which the front press ring 31 has been rotated relative to the lens frame 21 counterclockwise by 15° from the state illustrated in FIG. 10C. As understood from these figures, regardless of the rotational position of the front press ring 31 relative to the lens frame 21, at least one pair of long hole portions 31c and at least one pair of tool engagement portions 21d overlap each other in the optical axis direction. Therefore, the engagement portions 91a of the focusing tool 91 can be engaged with the pair of tool engagement portions 21d via the pair of long hole portions 31c and the lens unit 11 can be rotated about the optical axis.

In the states illustrated in FIGS. 10A and 10C, one tool engagement portion 21d overlaps each of the two long hole portions 31c located on both sides of the optical axis O (point-symmetrically with respect to the optical axis O). In the states illustrated in FIGS. 10B and 10D, one tool engagement portion 21d overlaps each of the four long hole portions 31c. Therefore, even if the proper screwed amount of the front press ring 31 with the lens frame 21 varies due to variations in component accuracy, the relative positional relationship between the long hole portions 31c and the tool engagement portions 21d will be close to one of the above two states. Hence, the engagement portions 91a of the focusing tool 91 can be engaged with the tool engagement portions 21d regardless of the component accuracy.

This embodiment can provide focusing by rotating the lens unit 11 relative to the fixed barrel 6 about the optical axis and by moving it in the optical axis direction without affecting the tightening state of the front press ring 31 relative to the lens frame 21.

In this embodiment, the length of the long hole portion 31c in the circumferential direction can be made smaller than that of the first embodiment. Therefore, it is possible to prevent the strength of the front press ring 31 from being lowered. Since the number of tool engagement portions 21d is smaller than that of the first embodiment, the component can be restrained from having a complicated shape.

The number of tool engagement portions 20d and 21d and long hole portions 40c and 31c described in the first and second embodiments are merely illustrative, and other numbers of engagement portions and long hole portions may be provided. In addition, instead of four long hole portions, three long hole portions may be provided. In a case where a lens unit has almost no variations in component accuracy described above, instead of the long hole portion, the press ring may have a circular hole portion slightly larger than the tool engagement portion.

Each of the above embodiments can realize a compact lens apparatus that can fix the lens to the holding member using the press member and adjust the position of the lens unit in the optical axis direction by rotating the lens unit relative to the fixed member without applying a rotational force to the press member.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. For example, this embodiment uses screwing as an example of a mechanical engagement, but can use another mechanical engagement, such as fitting (or mating).

This application claims the benefit of Japanese Patent Application No. 2021-205127, filed on Dec. 17, 2021, which is hereby incorporated by reference herein in its entirety.

What is claimed is:

1. A lens apparatus comprising a lens unit and a fixed member engaged with the lens unit,
   wherein a position of the lens unit relative to the fixed member is adjustable in an optical axis direction by rotating the lens unit relative to the fixed member about an optical axis of the lens unit,
   wherein the lens unit includes:
      a holding member configured to hold the lens and engaged with the fixed member; and
      a press member engaged with the holding member and configured to press the lens against the holding member in the optical axis direction,
      wherein the holding member includes an engagement portion engageable with a tool configured to rotate the lens unit about the optical axis relative to the fixed member,
      wherein the press member includes a hole portion penetrating in the optical axis direction, and
      wherein the hole portion enables the tool to be engaged with the engagement portion through the hole portion.

2. The lens apparatus according to claim 1, wherein the holding member includes, as the engagement portion, a pair of engagement portions located on both sides of the optical axis, and
   wherein the press member includes, as the hole portion, a pair of hole portions located on both sides of the optical axis so as to overlap the pair of engagement portions in the optical axis direction.

3. The lens apparatus according to claim 1, wherein the holding member includes, as the engagement portion, a plurality of engagement portions arranged around the optical axis,
   wherein the press member includes, as the hole portion, a plurality of long hole portions formed to extend around the optical axis, and
   wherein at least one of the plurality of engagement portions and at least one of the plurality of long hole portions overlap in the optical axis direction regardless of an engagement amount between the press member and the holding member.

4. The lens apparatus according to claim 1, wherein the hole portion includes a guide portion configured to guide the tool toward the engagement portion.

5. The lens apparatus according to claim 1, wherein the press member includes a female threaded portion engaged with a male threaded portion provided on an outer circumference portion of the holding member.

6. An image pickup apparatus comprising:
   a lens apparatus;
   an image sensor configured to capture an object image formed by the lens apparatus,
   wherein the lens apparatus includes a lens unit and a fixed member engaged with the lens unit,
   wherein a position of the lens unit relative to the fixed member is adjustable in an optical axis direction by rotating the lens unit relative to the fixed member about an optical axis,
   wherein the lens unit includes:
      a holding member configured to hold the lens and engaged with the fixed member; and
      a press member engaged with the holding member and configured to press the lens against the holding member in the optical axis direction,
      wherein the holding member includes an engagement portion engageable with a tool configured to rotate the lens unit about the optical axis relative to the fixed member,
      wherein the press member includes a hole portion penetrating in the optical axis direction, and
      wherein the hole portion enables the tool to be engaged with the engagement portion through the hole portion.

7. A lens apparatus comprising a lens unit and a fixed member engaged with the lens unit,
   wherein a position of the lens unit relative to the fixed member is adjustable in an optical axis direction by rotating the lens unit relative to the fixed member about an optical axis,
   wherein the lens unit includes:
      a holding member configured to hold the lens and engaged with the fixed member; and
      a press member engaged with the holding member and configured to press the lens against the holding member in the optical axis direction,
      wherein the holding member includes a pair of engagement portions located on both sides of the optical axis, and
      wherein the press member includes a pair of hole portions penetrating in the optical axis direction and located on both sides of the optical axis so as to overlap the pair of engagement portions in the optical axis direction.

* * * * *